9276X
G. C. Baldwin,
Making Crayons and Pencil Points.
Patented Dec. 2, 1835.
NO PRINTED COPY OF SPECIFICATION IN OFFICE.
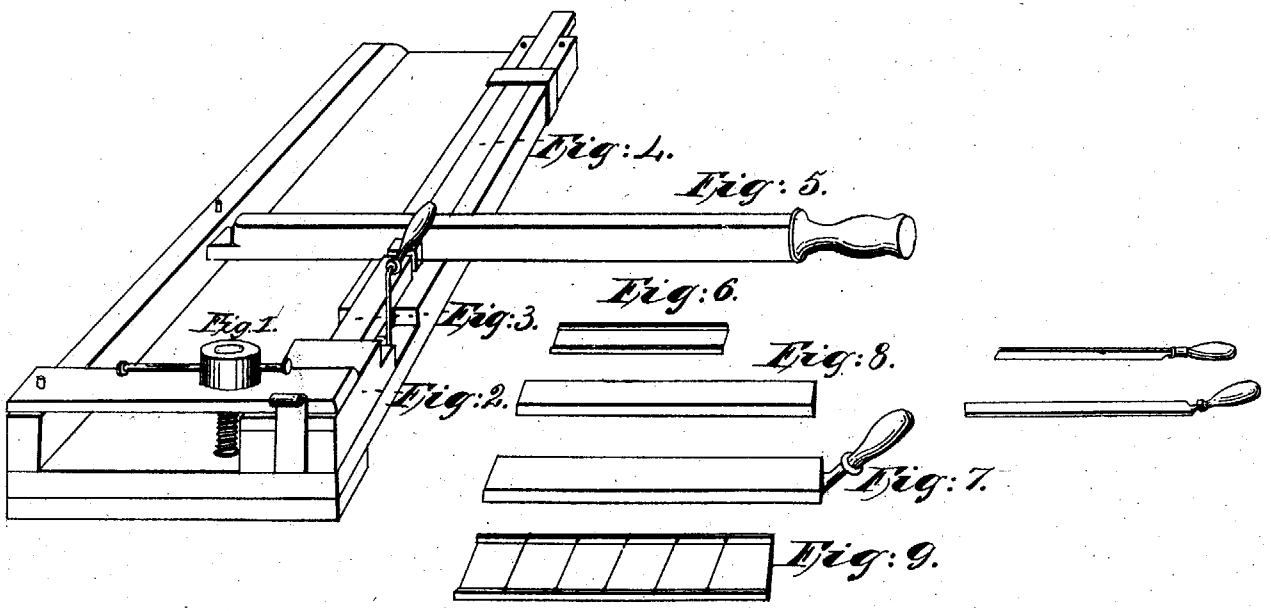

Guy C. Baldwin
Letters Patent

The Schedule referred to in these Letters Patent and making part of the same containing a description in the words of the said Guy C. Baldwin himself of his improvement in the composition of matter and machine for making Crayons & Pencil points To all whom these presents shall come: Be it known that I Guy C. Baldwin of Ticonderoga in the County of Essex and State of New York have invented a new and useful machine and composition of matter for Manufacturing Crayons and pencil points, and that the following is a full and exact description thereof ———

Composition for making Crayons and pencil points Take of Rosin and Pitch equal quantities and as much Gum Shellack as will give sufficient strength. then add finely pulverized Black lead of sufficient quantity when melted to form a soft paste. Process. Put all together into any convenient vessel and expose the mixture to a melting heat. and stir it with a trowel until it becomes of a uniform mixture and a soft yielding paste. In this state it is put into an iron mould ready heated and forced by the machine through one or more holes of any size. required and received on a thin plate in the form of round rods of proper length, for rolling the rods are then laid on a warm Iron plate and rolled with the hand board until they require sufficient smoothness. then laid in a straight position and cooled. When cold the rods are laid on the cutting board gauged to a proper length and then with the cutting knife are cut transversely

92767 versely, and ready for use. Description of the Machine. Figure 1st A vice attached horizontally to a platform with the screw perpendicular. Figure 2nd A cast iron mould six inches long four wide and two deep with a wooden handle and has a groove or hollow to receive the paste and one or more holes through the end to discharge it. the mould is placed in the vise and made fast. Figure 3d A follower about eight inches long suited to the groove in the mould and forces the paste through it. Figure 4th A slide confined by a groove in the plat form with a notch to receive the Lever and serve to keep the follower in a right direction. Figure 5th A Lever three feet in length worked by hand and acts on a pivot eight inches from the fulcrum or notch in the slide when moved forward carries the follower into the groove in the mould & forces the paste through the hole in the end on to the receiver. Figure 6th A receiver of wood or tin of any length required to receive the rods from the mould and on which they are laid ready for rolling. Figure 7th A rolling plate of cast iron sixteen inches long, four wide and one thick with a wooden handle and polished on one side very smooth for rolling. Figure 8th A hand board of wood of the same dimensions of the rolling plate and held in the hand when rolling the rods on the rolling plate. Figure 9 A cutting board sixteen inches long and three wide both sides and one end are raised one fourth of an inch above the face of the board. the sides are spaced into equal distances of proper lengths and sawed or cut down to the board to receive the cutting knife and on which the rods are laid while cutting. Figure 10th A A knife with a thin blade six inches long and to be used with a sharp and keen edge. Figure 11th A narrow trowel used to fill and clean the moulds. Note. any part or all of the above machine may be varied in size and proportion as may be found necessary and any preparation of Black lead when of the same consistance as above described can be manufactured into Crayons and points by the same operation of the machine Witnesses
Benj H. Baldwin
M. T. Clough Guy C. Baldwin (Drawing)

Exd
W.H.

(730 Words)